United States Patent Office 3,335,062
Patented Aug. 8, 1967

3,335,062
NUCLEAR REACTOR COOLANTS
Francis S. Feates, Argonne, Ill., and Roger Stuart Sach, Wantage, England, assignors to United Kingdom Atomic Energy Authority, London, England
Filed Dec. 9, 1965, Ser. No. 512,694
Claims priority, application Great Britain, Dec. 17, 1964, 51,464/64; June 16, 1965, 25,553/65
12 Claims. (Cl. 176—58)

The present invention relates to coolants for nuclear reactors and is particularly concerned with reactors having gaseous carbon dioxide as the coolant.

In many nuclear reactors, graphite is used as a moderator, the fuel elements being contained in channels through the moderator, the gaseous coolant passing through these channels to remove the nuclear heat generated in the fuel elements. In passing through the reactor the coolant gas thus comes into contact with the graphite moderator and, if the coolant is carbon dioxide, a chemical reaction between the graphite and the coolant gas may be induced by the influence of the ionising radiations within the reactor. This reaction can lead to the removal of graphite from the moderator with the subsequent deposition of carbon in some other part of the coolant circuit. In a reactor of the type known as the Advanced Gas Cooled Reactor, as constructed at Windscale, the coolant is carbon dioxide at 300 p.s.i. pressure and with an outlet temperature of at least 500° C. In this type of reactor, the reaction between the coolant and the graphite moderator could, if not checked, lead to a considerable loss of graphite from the moderator and this in turn would cause a loss in moderation power and a loss of structural strength of the moderator. Furthermore, deposition of carbon within the coolant circuit could result in the blocking of parts of this circuit.

It has been proposed to inhibit the radiation induced carbon dioxide-graphite reaction by maintaining a concentration of carbon monoxide in the carbon dioxide coolant and the addition of a paraffin hydrocarbon such as methane has also been proposed.

It is an object of the present invention to provide yet a further coolant to, and method for reducing the carbon dioxide-graphite reaction.

According to the present invention there is provided a coolant for a graphite moderated, gas-cooled nuclear reactor which comprises carbon dioxide containing a source of methyl or methylene radicals therein.

According to a further aspect of the present invention there is provided a method for reducing the radiation induced carbon dioxide-graphite reaction comprising passing into contact with the graphite a gaseous phase containing a source of methyl or methylene radicals.

The coolant or gaseous phase will usually consist essentially of carbon dioxide, but it should be appreciated that this carbon dioxide may also contain carbon monoxide in the equilibrium concentration (about 1% by volume) resulting from the carbon dioxide-graphite reaction and thus the term carbon dioxide is used to include carbon dioxide containing the equilibrium concentration of carbon monoxide.

We have found that inhibition of the carbon dioxide-graphite reaction may be obtained if the gaseous phase consists merely of an inert gas containing an additive in accordance with the invention. On passing carbon dioxide over the graphite subsequent to such treatment, the rate of the graphite gasification reaction was found to be reduced. Furthermore, we have found that inhibition is obtained over a wide range of carbon dioxide pressures and thus inhibition may be obtained when the coolant is an inert gas containing a small proportion of carbon dioxide, e.g. as impurity. The term "insert" is used herein to mean those gases which have little or no reaction with methyl or methylene radicals and are also, preferably relatively unreactive with respect to graphite and the radical sources and thus includes the rare gases, for example helium and gases such as nitrogen.

We have observed that some degree of inhibition occurs with a wide range of additives which are capable of giving rise to methyl or methylene radicals under the action of irradiation. Thus, the following methyl radical sources have been tested and found to provide some degree of inhibition of the carbon dioxide-graphite reaction: azomethane $((CH_3)_2)$, acetone $((CH_3)_2CO)$, acetyl acetone $(CH_3COCH_2COCH_3)$, acetaldehyde $(CH_3CHO)$, diacetyl $(CH_3COCOCH_3)$, diethyl ether $(C_2H_5OC_2H_5)$, tetra methyl silane $(Si(CH_3)_4)$, trimethylamine $(N(CH_3)_3)$ and xylene $(C_6H_4(CH_3)_2)$. Other possible sources of methyl radicals include tertiary-butyl peroxide $([(CH_3)_3CO]_2)$, tetra methyl lead $(Pb(CH_3)_4)$, toluene $(C_6H_5CH_3)$ and trimethyl-benzene $$(C_6H_3(CH_3)_3)$$

Methylene radical sources which have been studied include diketene $((CH_2CO)_2)$ or ketene $(CH_2CO)$, diazomethane $(CH_2N_2)$, ethylene $(CH_2CH_2)$, ethylene oxide

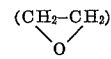

dichloromethane $(CH_2Cl_2)$ and acetylene $(CH \cdot CH)$.

The effect of these additives has been primarily studied using vacuum ultra-violet radiation and graphite labelled with carbon-14. Some of the additives have also been used in reactor experiments, the results of which were essentially the same as the experiments using vacuum ulta-violet radiation. The experiments of both types indicated that the additives were effective in reducing the gasification of the graphite and in the case of many of the additives it was found that the effect of the additive continued for some time after the additive had been removed and the gas changed to essentially pure carbon dioxide. Although the mechanism of inhibition is not fully understood, it is thought that adsorption of methyl or methylene radicals onto the surface of the graphite occurs and that these adsorbed radicals protect the graphite against oxidation. When the additive is removed from the gas stream, the radicals are slowly removed from the graphite surface until it returns to its previous state and the rate of oxidation returns to its original level. Not all the additives give rise to a persistent inhibiting effect however, and it is thought that these additives function primarily as gas phase scavengers of chemically active species, such as oxygen atoms, and give only a small contribution to inhibition by adsorption onto the graphite surface.

It will be appreciated that additives giving a persistent inhibiting effect need not be continuously injected into the reactor coolant and since it may be necessary to introduce the additive into the coolant only once in a day, or possibly at longer intervals, the use of such additives is to be preferred. We have found persistent inhibiting effects with azomethane, acetone, acetyl acetone, acetaldehyde, diacetyl, trimethylamine, xylene, ketene diazomethane and ethylene oxide, and, to a slightly lesser extent, with tetramethyl silane. With some of the additives however there may be a possibility of carbonaceous deposits being formed within the system and it is preferred to avoid the use of an additive in conditions in which it will form such deposits. Some of the possible additives are somewhat difficult to handle and thus, although these additives give satisfactory inhibition, it may be considered preferable to avoid their use.

It should be appreciated that the additives of the invention are degraded in use and must therefore be replaced but, as indicated, with additives giving persistent inhibition, periodic addition of the additive may prove sufficient to maintain the inhibition effect. The persistent inhibiting effect is of particular value in the event that the additive injecting mechanism breaks down, since the persistent effect will prevent excessive damage to the graphite whilst the mechanism is being repaired.

In order that the present invention may be more readily understood, several experiments illustrating the effect of the additive will now be described by way of example, reference also being made to the accompanying drawings wherein.

The experiments were all carried out in a generally similar manner, by passing a gas (simulating coolant gas) over a graphite sample labelled with the isotope carbon-14. After passage over the graphite, the activity of the effluent gas was monitored, this being a measure of the rate of oxidation of the graphite.

Figure 1:
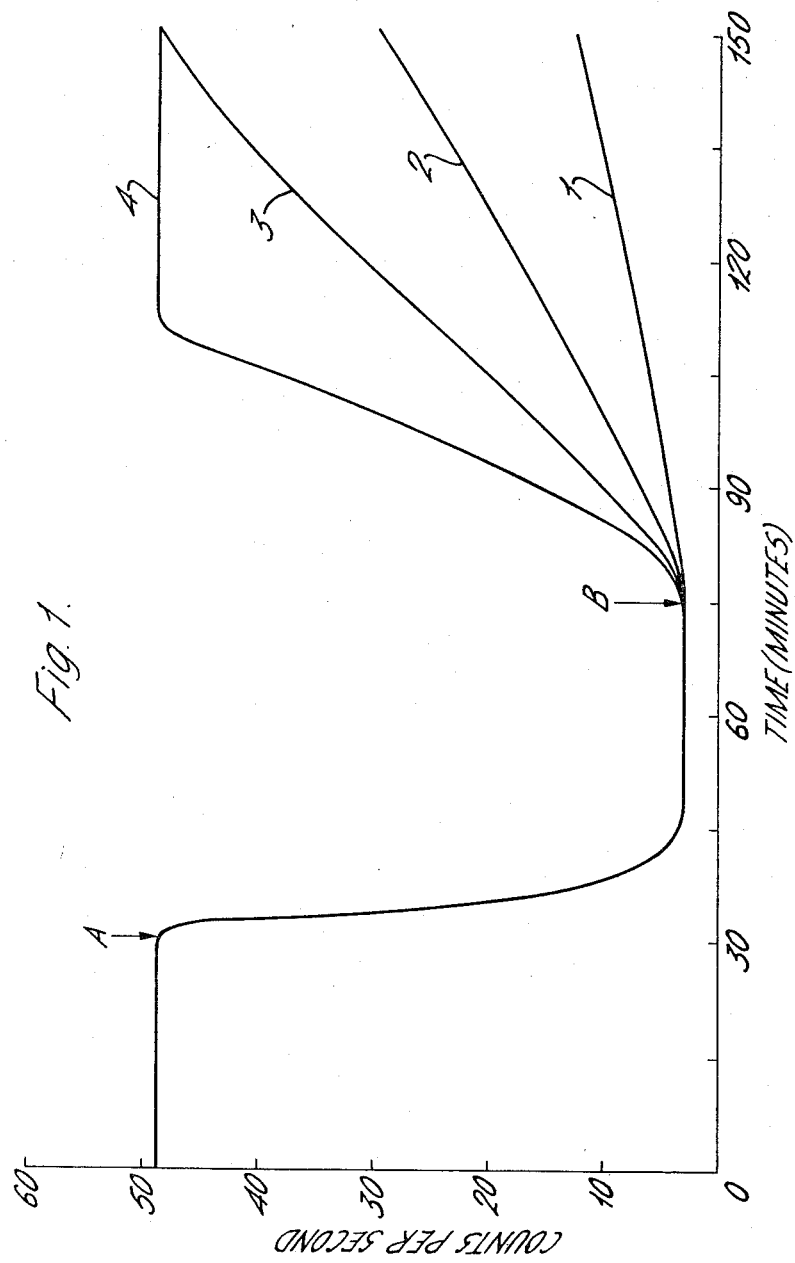
FIGURE 1 illustrates graphically the various types of recovery profile.

In FIGURE 1, the point A represents the changeover from pure carbon dioxide to the particular inhibiting mixture being used and point B represents the change back to pure carbon dioxide from the inhibiting mixture. The behaviour of all the mixtures between points A and B is essentially the same but beyond point B, the recovery to the reaction rate before inhibition may be divided into four different types as indicated by the curves 1, 2, 3 and 4.

Type 1 recovery shown by curve 1 is very slow and takes a considerable time, certainly much in excess of 5 hours and probably several days. This type of behaviour is thought to be due to the deposition of inactive, i.e. carbon-12 bearing, material on the graphite surface which prevents the oxidation of the radioactive carbon-14 in the graphite and thus results in the activity of the gas being less than if the graphite surface were not covered. The slow Type 1 recovery in the amount of carbon-14 in the effluent gas is due to the slow oxidation of the inactive layer on the graphite, and the consequent gradual exposure of the active surface until the whole of the deposited material has been oxidised off and the activity of the effluent gas has returned to its original level.

Type 2 recovery (shown by curve 2) is similar to Type 1 but is more rapid, recovery taking place in rather less than five hours. The difference between recovery of Type 2 and recovery of Type 1 is thought to be one of degree in that the amount of material deposited on the graphite is probably less for Type 2 recovery and thus the deposit is oxidised from the graphite surface more quickly than in Type 1 recovery.

Type 3 recovery (shown by curve 3) takes less than two hours and the additives giving this type of recovery are thought to form only a small amount of deposit and to function primarily as gas phase scavengers of oxygen atoms. The small amount of deposit is rapidly oxidised and the activity of the effluent gas soon recovers to its original value.

Type 4 recovery (shown by curve 4) corresponds to that obtained with a material giving pure gas phase scavenging with no deposit on the graphite and is very rapid, being of the order of 30 minutes.

The curves shown in FIGURE 1 were obtained using vacuum ultra-violet radiation and it was found that similar effects were obtained in reactor experiments except that the rates of recovery, particularly type 1 recovery, were longer in the reactor than when using ultra-violet radiation. Although a clear distinction cannot be made between Type 1 and Type 2 recovery, Type 1 recovery is preferred, although Type 2 is quite satisfactory and some materials showing Type 2 recovery in ultra-violet radiation have been found to show Type 1 recovery in reactor experiments, for example acetone. Further details of the experiments carried out are given in the following examples.

*Examples 1–3*

These examples illustrate the effect, on the carbon dioxide-graphite reaction, of a methyl radical source as the additive when the radiation was obtained from a vacuum ultra-violet source. The additives used were azomethane and acetone.

The reaction was carried out in a photolysis vessel having a lithium fluoride window on the other side of which was located a vacuum ultra-violet source. The source used in the experiments was a xenon source giving radiation of wave length 1470 A. An additional source giving mercury 2537 A. radiation was provided for use when the additive was acetone. A carbon-14 labelled graphite sample was located 2 mm. from the lithium fluoride window of the photolysis vessel.

Gas was passed through the vessel at a pressure of 30 cm. of mercury and a flow rate of 2.5 cm.$^3$ per minute. The gas was then passed to suitable counting apparatus to determine the activity due to the carbon-14 content of the gas, this activity arising due to the gasification of the labelled graphite sample.

Figure 2:
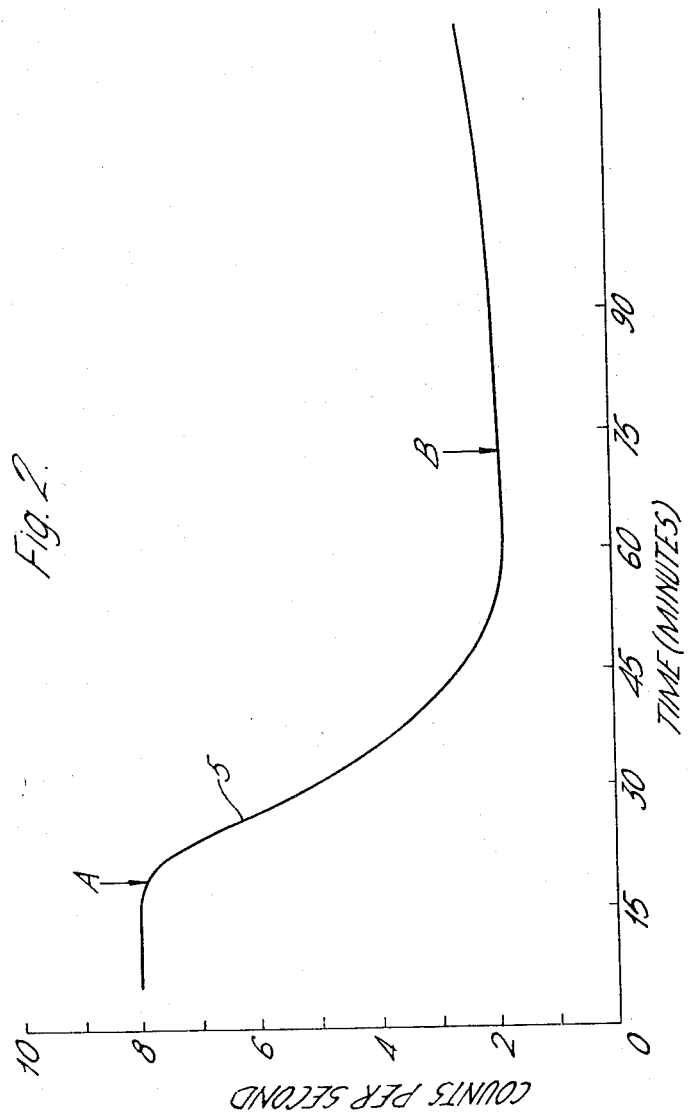
FIGURE 2 illustrates graphically the effect of an azomethane addition using vacuum ultra-violet radiation.
Figure 3:
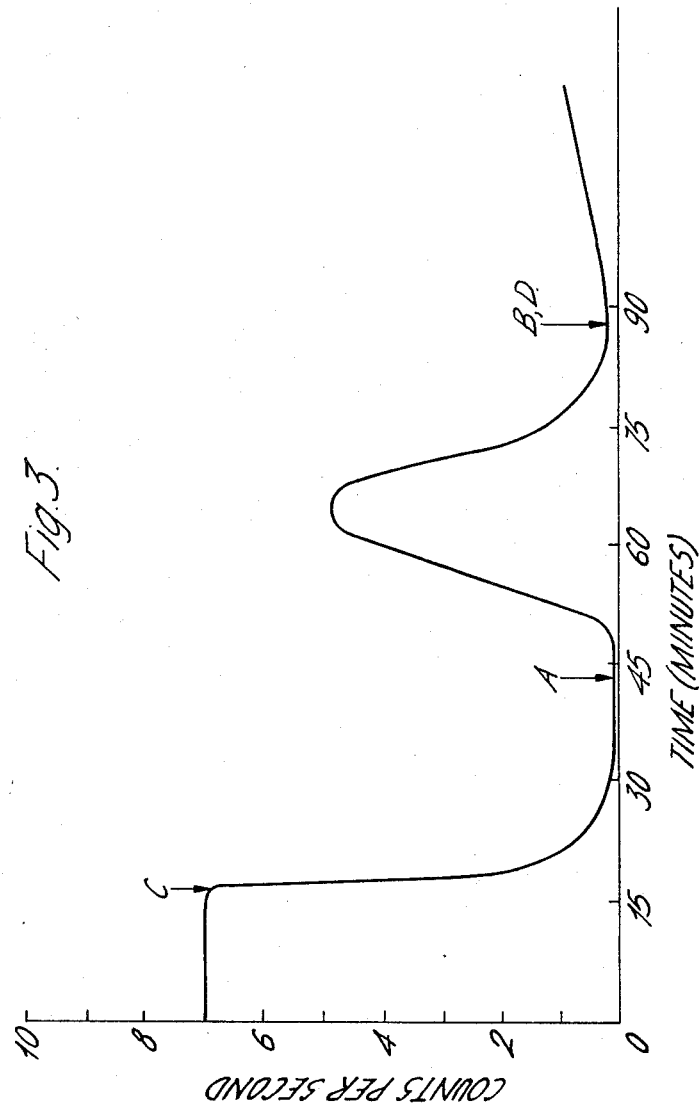
FIGURE 3 illustrates the effect of an azomethane addition in the absence of radiation.
Figure 4:
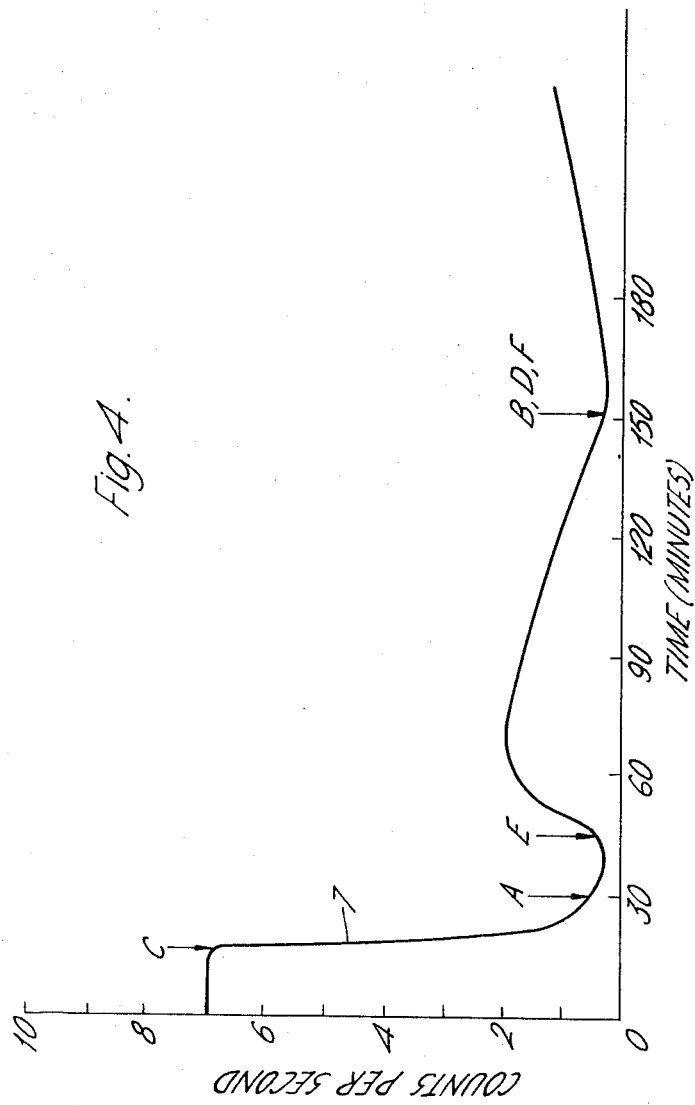
FIGURE 4 illustrates the effect of an acetone addition under conditions similar to those of FIGURE 3.

FIGURE 2 shows in curve 5 the results obtained using 0.03% by volume of azomethane in carbon dioxide in the above arrangement and FIGURE 3 shows in curve 6 the results obtained under slightly altered conditions. FIGURE 4 shows in curve 7 the results obtained using 0.04% by volume of acetone in carbon dioxide. The letters A and B on the curves have the same significance as in FIGURE 1 and the letters C–F represent the following operations:

$C$=switching off 1470 A. radiation,
$D$=switching on 1470 A. radiation,
$E$=switching on mercury 2537 A. radiation, and
$F$=switching off mercury 2537 A. radiation.

It should be realised that curve 5 was obtained with the xenon 1470 A. radiation switched on all the time, the decrease in the count rate being caused by changing from pure carbon dioxide to the inhibiting mixture. It will be observed that on changing back to pure carbon dioxide (point B), the count rate starts to increase fairly slowly and does not return immediately to the level it was at when the change from pure carbon dioxide to the inhibiting mixture was effected, and thus azomethane gives a Type 1 recovery.

In the curve (FIGURE 3), switching off the xenon 1470 A. radiation (point C), resulted in a decrease in the activity of the carbon dioxide, indicating that the carbon dioxide-graphite reaction has ceased. After changing to the inhibiting mixture, (point A) the activity of the gas increased and then returned to its original low level. The gas was then changed back to pure carbon dioxide and the 1470 A. radiation switched on again and a slow Type 1 increase in the activity of the gas was observed.

In curve 7 (FIGURE 4), after switching off the xenon radiation (point C), the actviity in the carbon dioxide fell. On changing to the acetone-containing inhibiting mixture (point A) no significant effect was observed until the mercury radiation was switched on (point E). A slow rise and fall in the activity of the gas was then observed, the activity eventually returning to the level at which it stood before the mercury radiation was switched on. The flow of pure carbon dioxide was then restored (point B), the mercury radiation switched off (point F) and the xenon radiation switched on (point D) and once more a slow Type 1 rise in the activity of the gas was observed.

Curve 5 shows that azomethane produces an inhibiting effect on the radiation induced reaction and that this effect is retained even when pure carbon dioxide replaces the inhibiting mixture.

on the radiation induced carbon dioxide graphite reaction using vacuum ultraviolet radiation as in Examples 1–3.

TABLE I

| Example | Additive | Conc.ⁿ (vol. percent) | Radiation Source | R₀/R | Temp. (° C.) | Recovery type |
|---|---|---|---|---|---|---|
| 5 | Ketene | 0.2 | Xe, Kr | 7 | 25 | 1 |
| 6 | do | 0.2 | Xe, Kr | 24 | 300 | 1 |
| 7 | do | 0.01 | Xe | 2.6 | 25 | 1 |
| 8 | do | 0.2 | Xe+Hg | 16 | 25 | 1 |
| 9 | Diazomethane | 0.2 | Xe, Kr | 6.0 | 25 | 1 |
| 10 | do | 0.2 | Xe, Kr | 7.0 | 300 | 1 |
| 11 | Acetylene | 0.1 | Xe | 9.0 | 25 | 3 |
| 12 | do | 0.1 | Xe | 21 | 300 | 3 |
| 13 | Ethylene | 0.1 | Xe | 7.5 | 25 | 3 |
| 14 | Azomethane | 0.03 | Xe | 50 | 25 | 1 |
| 15 | do | 0.01 | Xe | 14 | 25 | 1 |
| 16 | do | 0.1 | None | 4 | 25 | 1 |
| 17 | Acetone | 0.03 | Xe | 4.4 | 25 | 2 |
| 18 | do | 0.05 | Xe | 4 | 320 | 2 |
| 19 | Ethyleneoxide | 0.05 | Xe | { 20, 24 } | 320 | 1–2 |
| 20 | Dichloromethane | 0.05 | Xe | 8.1 | 25 | 2 |
| 21 | do | 0.05 | Xe | 2.7 | 320 | 2–3 |
| 22 | Acetylacetone | 0.05 | Xe | 12 | 320 | 1 |
| 23 | Acetaldehyde | 0.05 | Xe | 3 | 330 | 1 |
| 24 | Diacetyl | 0.05 | Xe | 15 | 320 | 1 |
| 25 | Diethylether | 0.05 | Xe | 20 | 320 | 3–2 |
| 26 | Tetramethyl silane | 0.05 | Xe | 11.4 | 25 | 2 |
| 27 | do | 0.05 | Xe | 11.7 | 350 | 1–2 |
| 28 | Trimethylamine | 0.05 | Xe | 4.0 | 320 | 1 |
| 29 | Xylene | 0.05 | Xe | >30 | 320 | 1 |

Curves 6 and 7 indicate that the activity resulted only when the source of radiation was switched on and thus that the activity is due to a radiation induced reaction. The peak obtained in curve 6 after changing to the inhibiting mixture is thought to be due to the desorption of radioactive gas from the surface of the graphite on which it was absorbed. The fact that the graphite was found to be protected against gasification by this treatment infers that methyl radicals have replaced the absorbed gases on the graphite surface, even in the absence of radiation. The slow increase in the gasification rate after returning to pure carbon dioxide can be explained in the manner set forth in the consideration of Type 1 recovery.

From curve 7, it will be seen that a peak in activity was obtained with an acetone containing mixture only when the mercury source was switched on and that the peak obtained was not as pronounced as with the azomethane containing mixture. It is thought that the acetone was effective only when the mercury source was switched on, since acetone is more stable than azomethane and does not give methyl radicals as readily. The mercury source provides the energy to cause breakdown of the acetone to form methyl radicals and give protection to the graphite surface in a similar manner to azomethane. The mercury source does not however cause gasification of the graphite.

The amount of activity desorbed in the experiments represented by curves 6 and 7 was essentially the same and was about $10 \times 10^{16}$ molecules of $C^{14}O_2$.

It is thought that in curve 5 and the curves of FIGURE 1, the desorption of active gas from the graphite surface forms part of the downward slope of the curve and thus no separate peak of desorption activity is obtained.

*Example 4*

The procedure using azomethane as described in relation to FIGURE 3, curve 6, was repeated substituting helium for carbon dioxide in the inhibiting mixture. The result obtained was similar to that using carbon dioxide in the inhibiting mixture.

*Examples 5–29*

Table I shows the inhibiting effect of various additives

The ratio $R_0/R$ is a measure of the inhibiting factor and is the ratio of the reaction rate in pure carbon dioxide to that in the mixture under investigation. The results for xylene and trimethylamine are somewhat uncertain due to the formation of a carbonaceous deposit on the source window during the course of the experiment.

Comparison of the recovery rates between experiments in which ketene was used as an inhibitor and those in which azomethane was used as an inhibitor indicate that azomethane gives a more prolonged inhibition, on returning to pure carbon dioxide, than does ketene under the same conditions.

In all the foregoing experiments, with the exception of Example 16, vacuum ultra-violet radiation was used throughout the experiment to give conditions similar to those described with reference to curve 5, FIGURE 2 (Example 1). A series of experiments was also conducted to determine the effect of the additives in a nuclear reactor and these are set forth in the following examples.

*Example 30*

In this experiment a reactor loop was set up simulating the pressure and temperature conditions proposed for the advanced gas cooled reactor and was operated using a graphite specimen labelled with carbon–14 so as to give 75,000 d.p.m. per micromole of carbon. The graphite specimen was of cylindrical form having a diameter of one centimetre and carbon dioxide was passed through the pores thereof at a feed rate of between 5 and 20 cc. of gas per minute (measured at N.T.P.). The graphite specimen was exposed to radiation at a dose rate of 100 milliwatts per gramme and under these conditions the reaction between graphite and carbon dioxide gives rise to carbon–14 in the gas which has passed through the specimen and so provides a measure of the rate of gasification.

Using this reactor loop with a coolant gas comprising carbon dioxide containing 0.3% by volume of carbon monoxide and 0.3% by volume of ketene, the carbon–14 evolution rate was between 1/25 and 1/40 of the rate using pure carbon dioxide as the coolant. This demonstrates the very marked inhibition of the reaction between carbon dioxide and graphite which takes place by using these additives. It is to be noted that in this loop experiment carbon monoxide was added, but under reactor conditions (except when a new charge of carbon dioxide is being used) the carbon monoxide contained in the coolant would approximate to the stable conditions.

After exposing the graphite specimen to the coolant containing ketene for a time of 72 hours the coolant was replaced by pure carbon dioxide. It was observed that the rate of carbon–14 evolution did not rise immediately and even after 14 days was still half that when the ketene had not been used. Moreover, this persistent inhibiting effect was not destroyed by heating the graphite to 900° C. in an inert atmosphere such as helium.

*Examples 31–36*

The reactor loop of Example 30 was used for a further series of experiments to determine the effect of varying the concentration of the additive, the gas pressure being 300 pounds/square inch, the gas flow rate 9 cc./min. and the temperature 375° C. for all the experiments.

The gasification rate, relative to that in carbon dioxide containing 1% by volume of carbon monoxide was reduced by a factor of about 15 on adding ketene to give concentrations of 750, 1000, 2000 and 3000 volume parts per million (v.p.m.). There was no significant change in the factor by which the gasification rate was reduced over the whole of this concentration range.

Additions of 200 and 500 v.p.m. of ketene gave reduction factors of four and eight respectively. The gasification rate in carbon dioxide containing 1% of carbon monoxide was found to be half that observed in pure carbon dioxide.

*Examples 37–39*

The gas mixture used in all these experiments was carbon dioxide containing 1000 v.p.m. of ketene and 1% of carbon monoxide, and the effect of varying the temperature was studied. The results are summarised in Table II.

TABLE II

| Example | Temp. (° C.) | Reduction Factor |
|---|---|---|
| 37 | 200 | 10 |
| 38 | 375 | 17 |
| 39 | 500 | 22 |

A series of six experiments was carried out to study the recovery rate of the graphite after being exposed to a gas mixture containing ketene additive. The amount of ketene added was in the range 200–3000 v.p.m. and the graphite was irradiated in this mixture for a period of 24–72 hours. The results obtained were consistent with a relationship: $ct = (250 \pm 15)R$.
where $c$ is the ketene concentration (in v.p.m.) in a 1% carbon monoxide, 99% carbon dioxide mixture;

$t$ is the exposure time (in hours); and $R$ is the time (in hours) for the carbon–14 activity in the effluent gas to recover to half the value normally obtained using pure carbon dioxide.

It will be appreciated that the relationship obtained in these experiments may only be true for a ketene additive under the particular conditions of the experiments. However, the experiments indicate that the persistence of inhibition is a function of additive concentration and the time for which it was used.

*Example 46*

A reactor experiment was carried out in a manner similar to that described in Example 30. The graphite temperature was 375° C. and the gas pressure 300 pounds per square inch. With pure carbon dioxide, the value of $G(-c)$ was 8.0, the factor $G(-c)$ being a measure of the ease of the graphite gasification reaction which may be defined as the carbon loss, in molecules of carbon lost, per 100 ev. of energy absorbed in the carbon dioxide. With an inhibiting mixture of carbon dioxide containing 625 v.p.m. of azomethane, the value of $G(-c)$ was below the limits of the apparatus, and was considerably less than 0.6. Thus, in the reactor, the inhibiting factor, using azomethane, is at least 13.3, and possibly much greater.

Further reactor experiments with the azomethane additive, have shown that during reactor shut-down it is possible to protect the graphite surface in a similar manner to the protection obtained using a vacuum ultra violet source and azomethane or acetone as described in Examples 1–3, referring to FIGURES 3 and 4, when protection was obtained with the source switched off. As described with reference to the vacuum ultra-violet source, a peak of activity due to desorption of active gases from the graphite surface was obtained in the reactor experiments.

*Examples 47–49*

Further reactor experiments were carried out at 375° C. and 300 pounds per square inch with 500 v.p.m. of actone or ethylene oxide. The inhibition factors obtained were 25 and 61 respectively. The addition of 1% carbon monoxide to the mixture containing ethylene oxide had no significant effect on the inhibition factor.

It should be observed that only in Example 30–45 was carbon monoxide added to the mixture and that in the other experiments no such addition was made. It is considered that, after exposure to radiation for some time, initially pure carbon dioxide will contain a small equilibrium proportion of carbon monoxide arising by radiolysis of the carbon dioxide, but Example 49 indicates that this carbon monoxide will have no significant effect on the inhibition factor and thus the present invention does not require the presence of carbon monoxide in addition to the radical sources.

We claim:

1. In a gas-cooled, graphite-moderated nuclear reactor, a coolant comprising carbon dioxide and up to about 3000 parts per million by volume of a radical source selected from the group consisting of azomethane, acetone, acetyl acetone, acetaldehyde, diacetyl, diethyl ether, tetramethyl silane, trimethylamine, xylene, tertiary-butyl peroxide, tetramethyl lead, toluene, trimethyl benzene, ketene, diazomethane, ethylene, ethylene oxide, dichloromethane and acetylene.

2. In a gas-cooled, graphite-moderated nuclear reactor, the coolant of claim 1 consisting essentially of carbon dioxide containing one of said radical sources.

3. In a gas-cooled, graphite-moderated nuclear reactor, the coolant of claim 1 wherein the radical source is present in a concentration of 200–3000 parts per million by volume.

4. In a gas-cooled, graphite-moderated nuclear reactor, the coolant of claim 2 consisting of carbon dioxide containing about 500 parts per million by volume of acetone.

5. In a gas-cooled, graphite-moderated nuclear reactor, the coolant of claim 2 consisting of carbon dioxide containing about 625 parts per million by volume of azomethane.

6. In a gas-cooled, graphite-moderated nuclear reactor, the coolant of claim 2 consisting of carbon dioxide containing about 500 parts per million by volume of ethylene oxide.

7. In a gas-cooled, graphite-moderated nuclear reactor, the coolant of claim 2 consisting of carbon dioxide containing 0.3–1.0% by volume of carbon monoxide and 200–3000 parts per million by volume of ketene.

8. In a gas-cooled, graphite-moderated nuclear reactor, a coolant comprising carbon dioxide and up to about 3000 parts per million by volume of a source of methylene radicals.

9. A method for reducing the radiation induced reaction between carbon dioxide and graphite comprising bringing into contact with graphite which is to be exposed to radiation and carbon dioxide, a gaseous phase which contains a radical source selected from the group consisting of azomethane, acetone, acetyl acetone, acetaldehyde, diacetyl, diethyl ether, tetramethyl silane, trimethylamine, xylene, tertiary-butyl peroxide, tetramethyl lead, toluene, trimethyl-benzene, ketene, diazomethane, ethylene, ethylene oxide, dichloromethane and acetylene.

10. The method of claim 9 wherein the gaseous phase consists essentially of carbon dioxide containing up to 3000 parts per million by volume of one of said radical sources.

11. The method of claim 9 wherein the radical source is selected from the group consisting of azomethane, acetone, acetyl acetone, acetaldehyde, diacetyl, trimethylamine, xylene, ketene, diazomethane, ethylene oxide and tetramethyl silane and the said source is added to the carbon dioxide gaseous phase intermittently.

12. The method of claim 9 when the gaseous phase contains carbon dioxide and a radical source and constitutes the coolant in a gas-cooled graphite moderated nuclear reactor.

References Cited
UNITED STATES PATENTS

| | | | |
|---|---|---|---|
| 2,765,358 | 10/1956 | Pichler et al. | 252—372 |
| 2,813,919 | 11/1957 | Pearce | 252—373 |

FOREIGN PATENTS 917,820  2/1963  Great Britain.

OTHER REFERENCES

Nuclear Science Abstracts, vol. 15, No. 29259 Radiation-Induced Reaction of Carbon Dioxide with Ethylene. C. E. Stoops and C. L. Furrow, p. 3773 of vol. 15, Nov. 30, 1961.

REUBEN EPSTEIN, *Primary Examiner.*